United States Patent
Gergen et al.

(10) Patent No.: US 7,107,489 B2
(45) Date of Patent: Sep. 12, 2006

(54) METHOD AND APPARATUS FOR DEBUGGING A DATA PROCESSING SYSTEM

(75) Inventors: Joseph P. Gergen, Manchaca, TX (US); Tan Nhat Dao, Austin, TX (US); Jerome Hannah, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 464 days.

(21) Appl. No.: 10/202,946

(22) Filed: Jul. 25, 2002

(65) Prior Publication Data

US 2004/0019825 A1    Jan. 29, 2004

(51) Int. Cl.
*G06F 11/00* (2006.01)

(52) U.S. Cl. .......................................... 714/30; 714/27

(58) Field of Classification Search ................. 714/25, 714/38, 41; 712/227; 700/26; 717/124
See application file for complete search history.

(56) References Cited

U.S. PATENT DOCUMENTS

| | | | |
|---|---|---|---|
| 5,675,729 A | 10/1997 | Mehring | |
| 5,737,516 A | 4/1998 | Circello et al. | |
| 5,751,735 A | 5/1998 | Tobin et al. | |
| 5,771,240 A * | 6/1998 | Tobin et al. | 714/724 |
| 5,812,830 A | 9/1998 | Naaseh-Shahry et al. | |
| 5,828,824 A * | 10/1998 | Swoboda | 714/25 |
| 5,867,644 A * | 2/1999 | Ranson et al. | 714/39 |
| 5,951,696 A | 9/1999 | Naaseh et al. | |
| 6,035,422 A * | 3/2000 | Hohl et al. | 714/35 |
| 6,134,676 A | 10/2000 | VanHuben et al. | |
| 6,154,857 A | 11/2000 | Mann | |
| 6,158,023 A | 12/2000 | Ubukata et al. | |
| 6,321,329 B1 | 11/2001 | Jaggar et al. | |
| 6,430,727 B1 * | 8/2002 | Warren | 716/4 |
| 6,725,363 B1 * | 4/2004 | Damron | 712/227 |
| 6,754,852 B1 * | 6/2004 | Swoboda | 714/39 |
| 6,779,145 B1 * | 8/2004 | Edwards et al. | 714/733 |
| 2002/0087918 A1 * | 7/2002 | Miura et al. | 714/38 |
| 2003/0046610 A1 * | 3/2003 | Yamamoto et al. | 714/34 |
| 2004/0078690 A1 * | 4/2004 | Kohashi | 714/38 |

OTHER PUBLICATIONS

DSP56800 16-bit Digital Signal Processor Family Manual, Motorola, Inc. 1996, pp. A-76, A-77, 9-17 through 9-21, and 9-28..
SC140 DSP Core Reference Manual, Motorola, Inc., 2000, pp. A-132 and pp. 4-1 through 4-56.

* cited by examiner

*Primary Examiner*—Scott Baderman
*Assistant Examiner*—Paul Contino
(74) *Attorney, Agent, or Firm*—James L. Clingan, Jr.; Susan C. Hill

(57) ABSTRACT

A data processing system (10) includes a CPU (12) and debug circuitry (16). CPU (12) can execute instructions which provide direct input to one or more of trigger circuitry (32), multi-function debug counters (34), combining logic (36), and action select and control logic (38). Breakpoints can be cascaded, and separate breakpoint sequences can be triggered from a same trigger. A selected trigger (117) can produce a resulting action or trigger (119) but only if it occurs in a predetermined order compared to one or more other triggers (117). Multi-function debug counters (34) can perform a wide variety of programmable functions, can be started and stopped using the same or separate triggers, and can be optionally concatenated with each other.

16 Claims, 7 Drawing Sheets

| | CPU INSTRUCTIONS USED TO AFFECT DEBUG CIRCUITRY | |
|---|---|---|
| DEDICATED SPECIAL PURPOSE CPU INSTRUCTIONS USED FOR CONTROLLING COUNTER(S) IN DEBUG CIRCUITRY | DEBUGCTR ON | – TURNS ON DEBUG PORT COUNTER(S) |
| | DEBUGCTR OFF | – TURNS OFF DEBUG PORT COUNTER(S) |
| | DEBUGCTR HALT | – TURNS OFF COUNTER(S), CANNOT BE RESTARTED |
| | DEBUGCTR RELOAD | – RELOAD DEBUG COUNTER(S) |
| | DEBUGCTR TO_TRACE | – COPY VALUE IN COUNTER(S) TO TRACE BUFFER |
| | DEBUGCTR TO_TX | – COPY VALUE IN COUNTER(S) TO TRANSMIT AND RECEIVE CIRCUITRY |
| DEDICATED SPECIAL PURPOSE CPU INSTRUCTIONS USED FOR CONTROLLING OTHER DEBUG CIRCUITRY | TRACE CAPTURE ON | – TURNS ON TRACE CAPTURE |
| | TRACE CAPTURE OFF | – TURNS OFF TRACE CAPTURE |
| | TRACE CAPTURE HALT | – TURNS OFF CAPTURE – CANNOT BE RESTARTED |
| | TX PORT ON | – TURNS ON TX PORT |
| | TX PORT OFF | – TURNS OFF TX PORT |
| | TX PORT HALT | – TURNS OFF TX PORT – CANNOT BE RESTARTED |
| | RX PORT ON | – TURNS ON RX PORT |
| | RX PORT OFF | – TURNS OFF RX PORT |
| | RX PORT HALT | – TURNS OFF RX PORT – CANNOT BE RESTARTED |

*FIG.3*

DEBUGEV INSTRUCTION

OPERATION: GENERATE A DEBUGGING EVENT     ASSEMBLER SYNTAX: DEBUGEV

DESCRIPTION: GENERATE A DEBUGGING EVENT.

CONDITION CODES AFFECTED: NO CONDITION CODES ARE AFFECTED.

INSTRUCTION FIELDS:

| OPERATION | OPERANDS | C | W | COMMENTS |
|---|---|---|---|---|
| DEBUGEV | | 3 | 1 | GENERATE A DEBUG EVENT |

BIT LOCATION:

| 15 | | | 12 | 11 | | | 8 | 7 | | | 4 | 3 | | | 0 |
|---|---|---|---|---|---|---|---|---|---|---|---|---|---|---|---|
| 1 | 1 | 1 | 0 | 0 | 1 | 1 | 1 | 0 | 0 | 0 | 0 | 0 | 0 | 1 | 1 |

INSTRUCTION OPCODES:

TIMING: 3 OSCILLATOR CLOCK CYCLES

MEMORY: 1 PROGRAM WORD

*FIG. 4*

```
SOFTWARE PROGRAM UNDER DEBUG
⋮
ADD
JMP
LOAD
DEBUGCTR ON    ;DEBUG INSTRUCTION INSERTED TO START DEBUG COUNTER
JSR
STORE
SUB
JSR
DEBUGCTR OFF   ;DEBUG INSTRUCTION INSERTED TO HALT DEBUG COUNTER
LOAD
CMP
⋮
```

METHOD AND APPARATUS FOR DEBUGGING A DATA PROCESSING SYSTEM

RELATED APPLICATIONS

This application is related to:

U.S. patent application docket number SC12020TH, entitled "METHOD AND APPARATUS FOR DEBUGGING A DATA PROCESSING SYSTEM," filed simultaneously herewith, and assigned to the assignee hereof; and U.S patent application docket number SC12021TH, entitled "METHOD AND APPARATUS FOR DEBUGGING A DATA PROCESSING SYSTEM," filed simultaneously herewith, and assigned to the assignee hereof.

FIELD OF THE INVENTION

The present invention relates to a data processing system, and more particularly to a method and apparatus for debugging a data processing system.

BACKGROUND OF THE INVENTION

As data processing systems and their corresponding software get more and more complex, it is becoming even more important to provide improved and more flexible capabilities for debugging a data processing system itself and its corresponding software, while using as little integrated circuit area as possible. Many prior art debug related protocols and standards exist, such as JTAG (Joint Technology Action Group) which has been standardized by the IEEE (Institute of Electrical and Electronic Engineers) and OnCE (On Chip Emulation) which is available from Motorola, Inc. on a variety of integrated circuits.

BRIEF DESCRIPTION OF THE DRAWINGS

The present invention is illustrated by way of example and not limited by the accompanying figures, in which like references indicate similar elements, and in which:

FIG. 3 illustrates, in tabular form, some CPU instructions used to affect debug circuitry 16 of FIG. 1 in accordance with one embodiment of the present invention;

FIG. 4 illustrates, in tabular form, the functionality of one CPU instruction used to affect debug circuitry 16 of FIG. 1 in accordance with one embodiment of the present invention;

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

As used herein, the term "bus" is used to refer to a plurality of signals or conductors which may be used to transfer one or more various types of information, such as data, addresses, control, or status.

Figure 1:
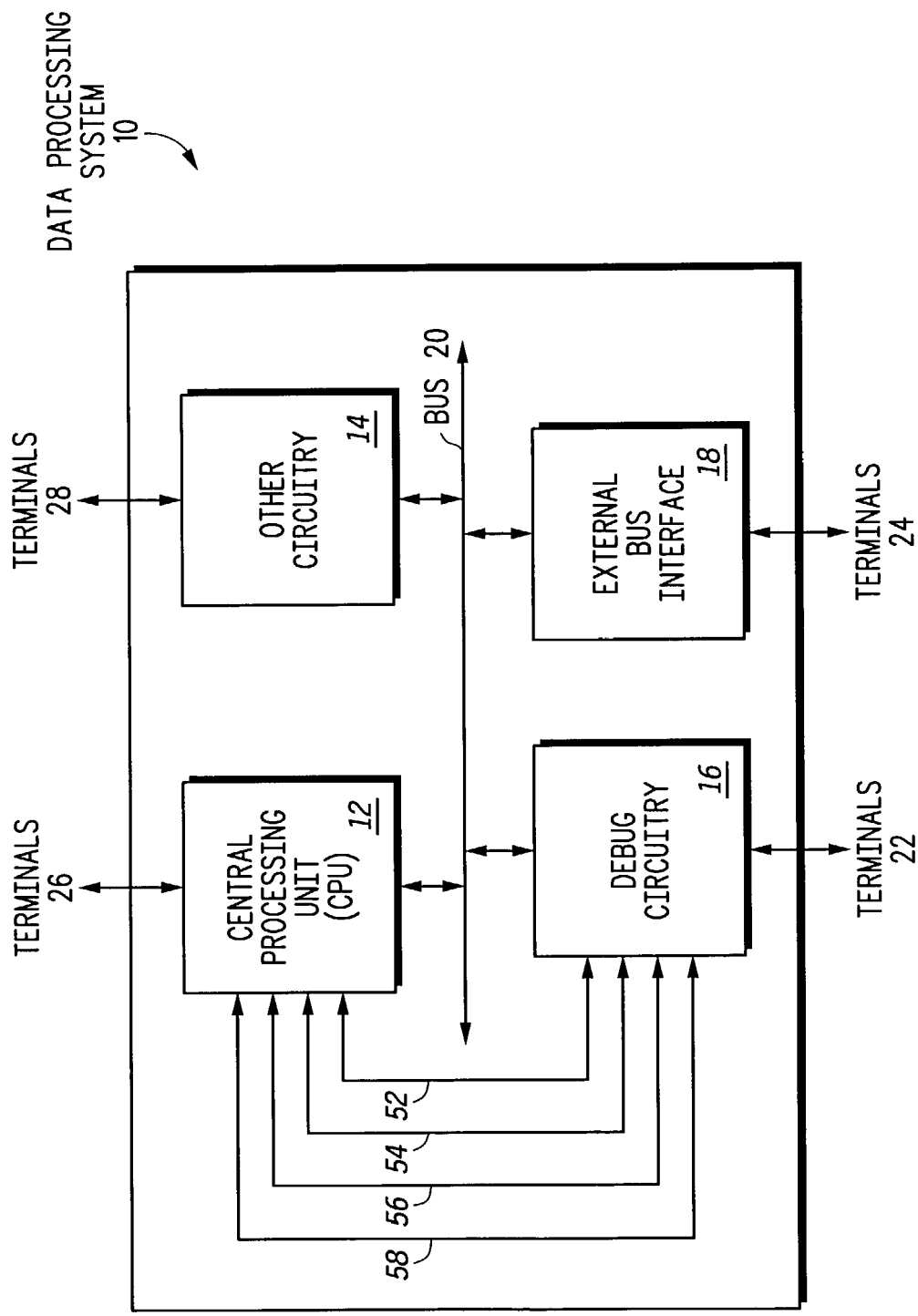
FIG. 1 illustrates, in block diagram form, a data processing system 10 in accordance with one embodiment of the present invention.

FIG. 1 illustrates, in block diagram form, a data processing system 10 in accordance with one embodiment of the present invention. In one embodiment of the present invention, data processing system 10 is implemented on a single integrated circuit. In one embodiment, data processing system 10 includes central processing unit (CPU) 12, other circuitry 14, debug circuitry 16, and external bus interface circuitry 18 which are all bi-directionally coupled by way of bus 20. In alternate embodiments of the present invention, debug circuitry 16 may not be coupled to bus 20. Alternate embodiments of the present invention may not include external bus interface 18, and alternate embodiments of the present invention may not include other circuitry 14. Other circuitry 14 may include any type of circuitry performing any type of function, such as, for example, any type of memory, timer circuitry, communication circuitry, one or more additional processing units, analog to digital conversion circuitry, customized circuitry for performing a predetermined functionality, etc.

In one embodiment of the present invention CPU 12 is coupled external to data processing system 10 by way of one or more terminals 26, other circuitry 14 is coupled external to data processing system 10 by way of one or more terminals 28, debug circuitry 16 is coupled external to data processing system 10 by way of one or more terminals 22, and external bus interface 18 is coupled external to data processing system 10 by way of one or more terminals 24. Alternate embodiments of the present invention may not implement one or more of terminals 22, 24, 26, and 28; however for most applications, data processing system 10 will have at least one terminal to communicate externally. Also, in alternate embodiments of the present invention, terminals 22, 24, 26, and 28 may be uni-directional or bi-directional. In one embodiment of the present invention, integrated circuit terminals 22, 24, 26, and 28 may be implemented using integrated circuit pins, integrated circuit bumps, wires, or any type of conductor that is used to electrically coupled data processing system 10 to something which is external to data processing system 10. In one embodiment of the present invention, debug circuitry 16 and terminals 22 comply with the JTAG standard and the OnCE protocol. Alternate embodiments of the present invention may use any protocol and standard for operating and communicating with debug circuitry 16.

Aside from bus 20, CPU 12 is also bi-directionally coupled to debug circuitry 16 by way of a plurality of conductors 52, 54, 56, and 58. In alternate embodiments of the present invention, one or more of conductors 52, 54, 56, and 58 may be unidirectional.

Figure 2:
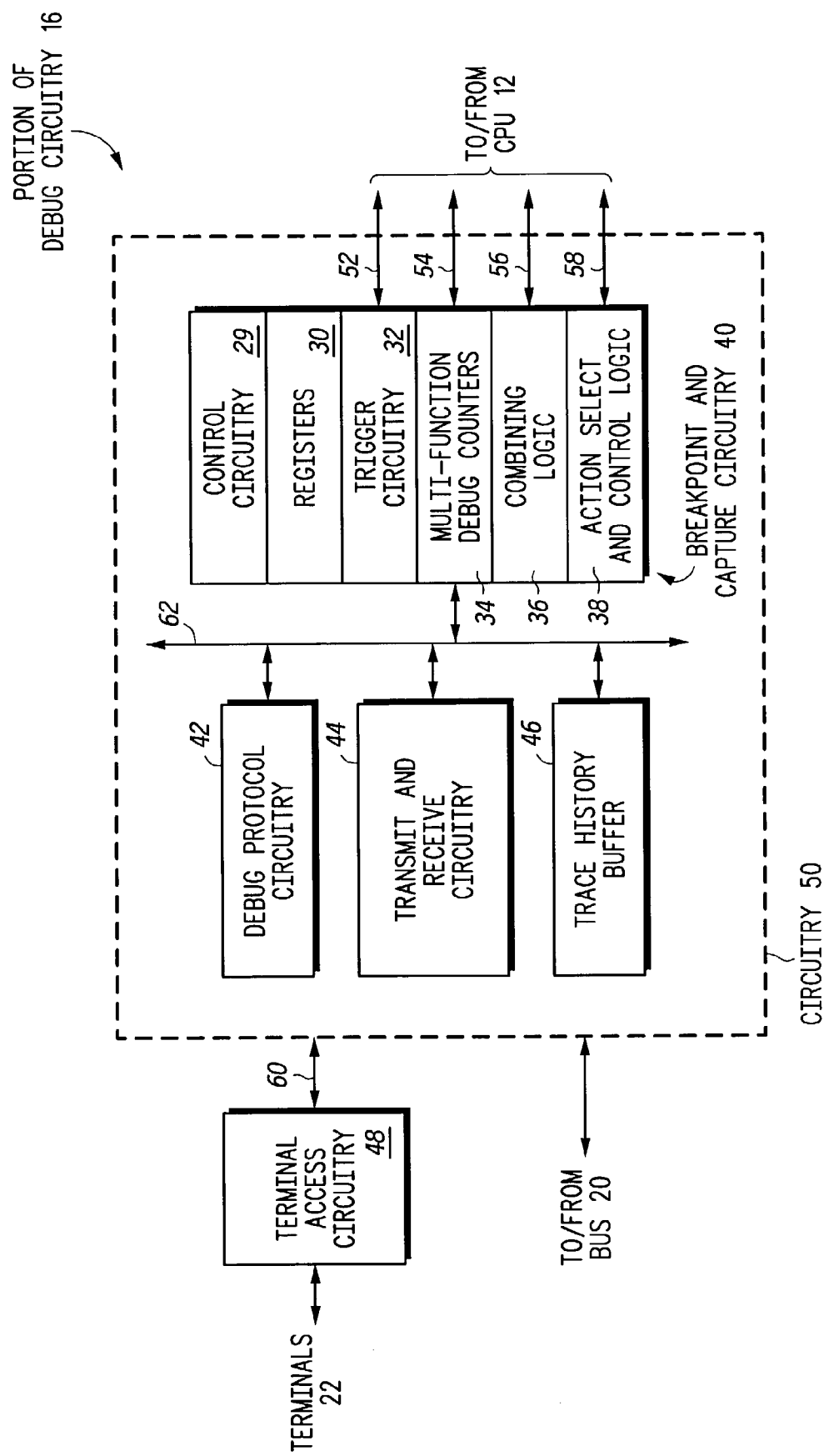
FIG. 2 illustrates, in block diagram form, a portion of debug circuitry 16 of FIG. 1 in accordance with one embodiment of the present invention.

FIG. 2 illustrates, in block diagram form, a portion of debug circuitry 16 of FIG. 1 in accordance with one embodiment of the present invention. The illustrated portion of debug circuitry 16 includes terminal access circuitry 48 which is bi-directionally coupled to terminals 22. Terminal access circuitry 48 is bi-directionally coupled to circuitry 50 by way of conductors 60. Bus 20 is also bi-directionally coupled to circuitry 50. Circuitry 50 illustrated in FIG. 2 includes debug protocol circuitry 42, transmit and receive circuitry 44, trace history buffer 46, and breakpoint and capture circuitry 40, which are all bi-directionally coupled by way of conductors 62. Alternate embodiments of the present invention may couple the circuitry within debug circuitry 16 in other ways than shown in FIG. 2. In one embodiment of the present invention, breakpoint and capture circuitry 40 includes control circuitry 29, registers 30, trigger circuitry 32, multi-function debug counters 34, combining logic 36, and action select and control logic 38.

Debug protocol circuitry 42 implements a protocol for the input and output of data through conductors 60 and bus 20. The present invention is completely independent of the protocol used; the protocol can be any known or yet to be created protocol. Alternate embodiments of the present invention may use both conductors 60 and bus 20, just conductors 60, or just bus 20. The Transmit and Receive Circuitry 44 is used to transmit data between bus 20, conductors 62, and conductors 60. Trace history buffer 46 may be used in some embodiments of the present invention to save software program "history", such as prior program execution memory addresses.

Control circuitry 29 provides for the control and the interaction of the blocks within breakpoint and capture circuitry 40, and also may be used to control transmit and receive circuitry 44 and trace history buffer 46. In one embodiment of the present invention, registers 30 are used to store data used within breakpoint and capture circuitry 40, such as, for example, breakpoint addresses and counter preload values. Registers 30 also contain control registers for programming the operation of breakpoint and capture circuitry 40. In one embodiment of the present invention, multi-function debug counters 34 include a plurality of counters that can be configured for more than one function. For example, in one configuration, the counters can be used to count triggers from breakpoint matches, while in another configuration the counters can be used to count clock periods. Alternate embodiments of the present invention may use multi-function debug counters 34 for any function. Combining logic 36 uses information from registers 30 to direct the combining of information from conductors 56, trigger circuitry 32 and multi-function debug counters 34 to generate valid triggers. The action select and control logic 38 can be used to select one or more actions using the triggers from combining logic 36.

Trigger circuitry 32 is bi-directionally coupled to CPU 12 through one or more conductors 52. In one embodiment of the present invention, conductor 52 can be used by CPU 12 (see FIG. 1) to reset or modify a trigger sequence performed by a portion of trigger circuitry 32 as a result of the execution of a CPU instruction or any general CPU 12 execution event, state, or condition. The multi-function debug counters 34 are bi-directionally coupled to CPU 12 through one or more conductors 54. In one embodiment of the present invention, the multi-function debug counters 34 can be controlled by the DEBUGCTR instructions (see FIG. 3) and can have events in CPU 12 affect the operation of one or more counters (e.g. stopping, starting, and/or loading one or more counters). Also, one or more counters within multi-function debug counters 34 can generate one or more interrupts to CPU 12.

Combining logic 36 is bi-directionally coupled to CPU 12 through one or more conductors 56. In one embodiment of the present invention, CPU 12 can use conductors 56 to signal the execution of the DEBUGEV instructions or any general CPU 12 execution event, state, or condition. The action select and control logic 38 is bi-directionally coupled to CPU 12 through one or more conductors 58. The execution of a CPU 12 instruction for halting the CPU 12 and entering a debug operation mode can be signaled by way of conductors 58. Also, interrupts as the result of debug operations can be signaled through conductors 58. In one embodiment of the present invention, CPU 12 can signal through conductors 58 to dynamically change the action to be taken by action select and control logic 38. Alternate embodiments of the present invention may have fewer, different, or more blocks of circuitry within breakpoint and capture circuitry 40.

Conductors 62 can be used to transfer information to and from breakpoint and capture circuitry 40 and other portions of debug circuitry 16. This information can include the reception or transmission of intermediate triggers through conductors 62 to multi-function debug counters 24, combining logic 36, or action select and control logic 38. In addition, conductors 62 can be used to transmit trigger signals to control the operation of the trace history buffer 46. In one embodiment, this would allow for triggers to start and halt the capture of trace information in the trace history buffer 46. Also, conductors 62 can be used to transmit triggers to control the operation of the transmit and receive circuitry 44. In one embodiment of the present invention, triggers may be used to dynamically enable and/or disable the operation of the transmit and receive circuitry 44. Triggers can enable and/or disable the transmit and receive functions either separately or in conjunction with each other. If transmission is disabled, then data transmission is not possible, which in one embodiment can be accomplished by ignoring writes to transmit register(s). Likewise, if reception is disabled, then data reception is not possible, which in one embodiment can be accomplished by ignoring reads from receive register(s).

FIG. 3 illustrates some CPU instructions that can be used to control debug circuitry 16 of FIG. 1 in accordance with one embodiment of the present invention. A portion of the instructions illustrated in FIG. 3, however, are used for controlling debug circuitry 16 resources other than the action select and control logic 38. Some instruction illustrated in FIG. 3 are used for controlling the multi-function debug counters 34, the trace history buffer 46, and the transit and receive circuitry 44. Alternate embodiments of the present invention may have instructions that control any portion of debug circuitry 16. Instead of simply generating debug actions, these instructions directly control debug port resources. For example, instead of requiring an event to trigger the start of one of the multi-function debug counters 34, it is now possible to start one of the multi-function debug counters 34 with a single instruction, namely DEBUGCTR ON. Similar instructions exist for enabling or disabling capture in the trace history buffer 46, and for enabling or disabling the functionality of the transmit and receive circuitry 44. Alternate embodiments of the present invention may have fewer, more, or different instructions for directly controlling one or more specific resources within debug circuitry 16.

FIG. 4 illustrates, in tabular form, the functionality of one CPU 12 instruction used to affect debug circuitry 16 of FIG. 1 in accordance with one embodiment of the present invention. The instruction illustrated in FIG. 4 can be used as an input for generating complex triggering conditions, which is performed in combining logic 36 (see FIG. 2). Although the prior art DEBUG instruction could be used for performing debug actions, the prior art DEBUG instruction could not be used in generating complex triggering conditions, such as the example described herein below for FIG. 6.

Figure 5:
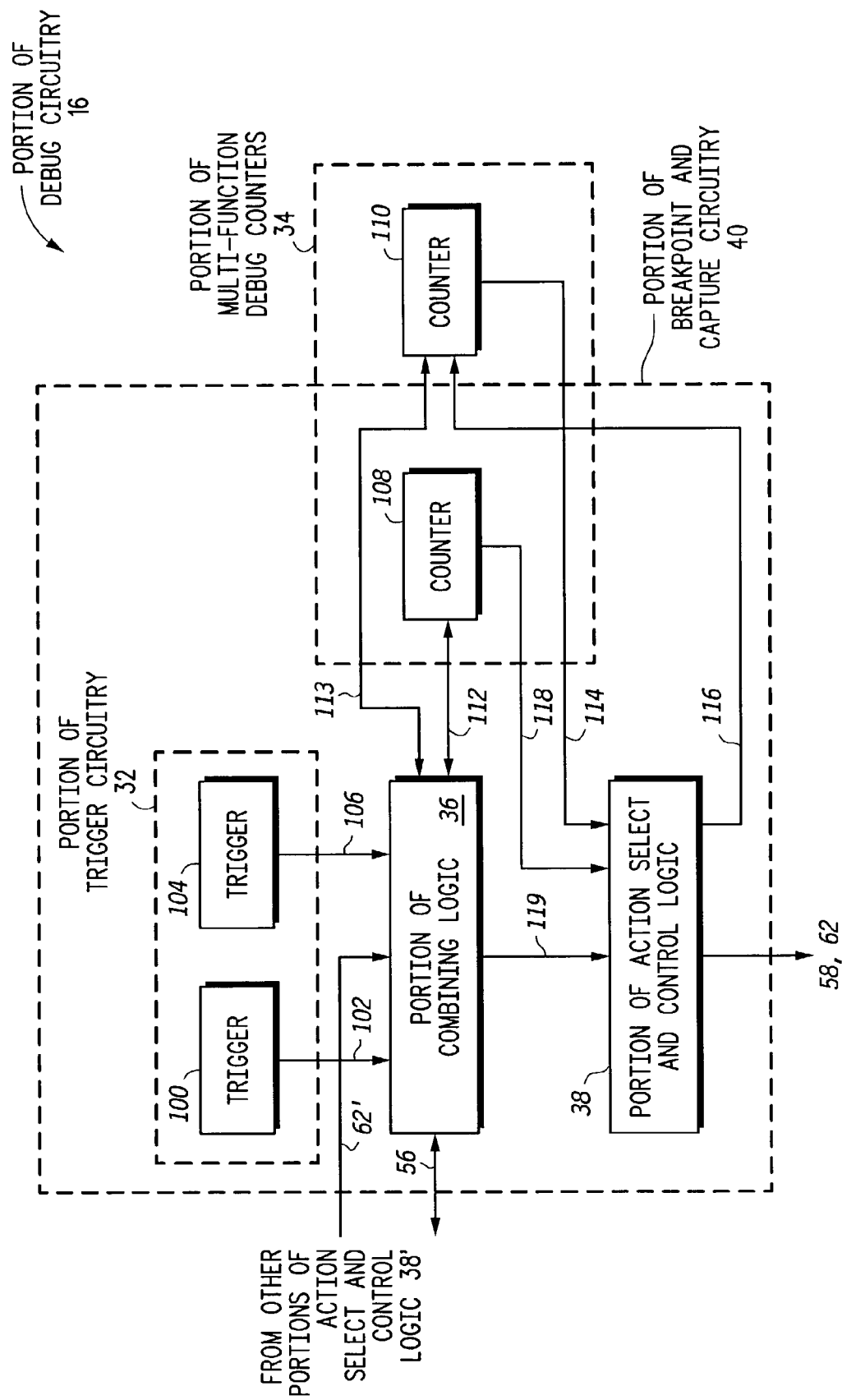
FIG. 5 illustrates, in block diagram form, a portion of debug circuitry 16 of FIG. 1 in accordance with one embodiment of the present invention.

FIG. 5 illustrates a portion of debug circuitry 16 of FIG. 1 in accordance with one embodiment of the present invention. In FIG. 5 a portion of trigger circuitry 32, namely trigger units 100 and 104, are used to generate hardware breakpoint triggers when there is a match between a predetermined trigger value and a value on a portion of bus 20 (e.g. address or data from CPU 12). Alternate embodiments of the present invention may have any number of triggers 100, 104. The hardware breakpoint triggers 100, 104 are sent to a portion of the combining logic 36 by way of conductors 102 and 106 respectively, where they are combined with other trigger sources, such as inputs 56 from CPU 12, outputs 62' from other portions of action select and control logic 38', or outputs from multi-function debug counters 34. All trigger sources can then be combined in the portion of combining logic 36 in a manner selected by the user (e.g. by way of control bits in registers 30). Examples of how these can be combined are ANDing, ORing, as well as sequencing the trigger sources (e.g. detecting the arrival of one trigger source before another arrives).

Conductor 56 is used as an input to combining logic 36 to accept events from CPU 12 in the generation of final triggers. In one embodiment, combining logic 36 uses the execution of the DEBUGEV instruction in trigger generation. In a first example using the circuitry illustrated in FIG. 5, it is possible to generate a final trigger 119 only after finding a first trigger (trigger 100), followed by finding a second trigger (trigger 104), followed by the execution of a DEBUGEV instruction by CPU 12. Only upon finding this precise sequence is a debug action performed by the action select and control logic 38 (see FIG. 2). In a second example, final trigger 119 can be generated after finding a first trigger (trigger 100) followed by finding either a second trigger (trigger 104) or the execution of a DEBUGEV instruction. In a third example, one of the multifunction counters can be started with the execution of a DEBUGEV instruction and stopped upon detecting a first trigger.

The portion of combining logic 36 illustrated in FIG. 5 provides an output signal 119 which indicates that a valid trigger or triggers have been found. An example of the use of multiple triggers is the case where a first trigger (e.g. 100) is used to start a counter 34 or trace history buffer 46 capture, and a second trigger (e.g. 104) is used to stop the counter 34 or the capturing. Once valid triggers have been found, debug actions can then be taken, such as generating interrupts, halting CPU 12, starting and/or stopping trace history buffer 46 capture, and starting and/or stopping a counter in multifunction debug counters 34. Note that a valid trigger can also be sent as an intermediate trigger to another location within debug circuitry 16 (e.g. action and intermediate trigger 62 of FIG. 6).

Counters 108 and 110 are a portion of multi-function debug counters 34. Counter 108 can be used to count N occurrences of a trigger before generating a valid trigger 119. Counter 10 can be used to delay the generation of a trigger by the predetermined count value. In the present invention, counters 108 and 110 can perform these functions; but counter 108 and 110 can also perform other functions. Counter 108 can also be used for counting events or for counting clocks between two triggers. Counter 110 can also be used in a manner where a first debug action is performed when valid trigger 119 occurs and a second debug action is performed after being delayed by the value in counter 110. For example, trace history buffer 46 capture may begin when counter 110 begins counting and may end when counter 110 has completed counting.

Counters 108 and 110 can optionally be combined or concatenated to functionally form a single counter which performs a single function with more bits in the counter. In one embodiment of the present invention, counter 108 is 16-bits and counter 110 is 24-bits; thus, when counters 108 and 110 are combined, they form a single 40-bit counter. In this capacity, the 40-bit counter may then be used for any counter function, including event counting or counting clocks between two triggers. Alternate embodiments of the present invention may use any number of counters in multi-function debug counters 34, and the length of these counters may be different from each other and may be any desired length.

Counter 108 is bi-directionally coupled to a portion of combining logic 36 by way of one or more conductors 112. Counter 108 is coupled to a portion of action select and control logic 38 by way of conductors 118. Counter 110 is bi-directionally coupled to a portion of combining logic 36 by way of one or more conductors 113. Counter 110 is coupled to a portion of action select and control logic 38 by way of conductors 116. In one embodiment of the present invention, a debug port resource is considered to include counters 34 (see FIG. 5) as well as transmit and receive circuitry 44 and trace history buffer 46 (see FIG. 2).

Figure 6:
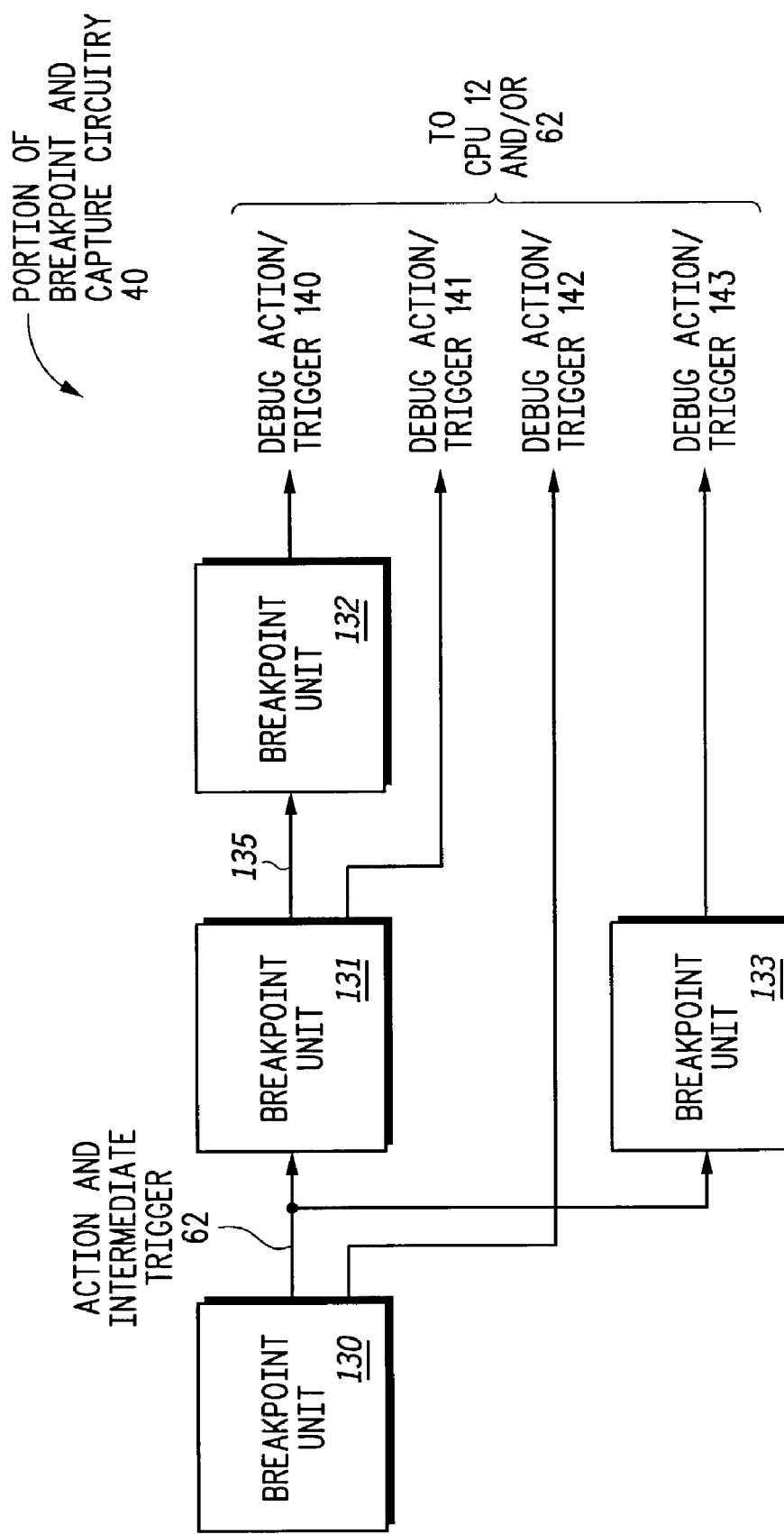
FIG. 6 illustrates, in block diagram form, a portion of breakpoint and capture circuitry 40 of FIG. 2 in accordance with one embodiment of the present invention.

FIG. 6 illustrates a portion of breakpoint and capture circuitry 40 of FIG. 2 in accordance with one embodiment of the present invention. In the illustrated embodiment, breakpoint and capture circuitry 40 includes breakpoint units 130, 131, 132, and 133. Breakpoint unit 130 provides an action and intermediate trigger signal to breakpoint units 131 and 133 by way of conductors 62. Breakpoint unit 130 provides a debug action/trigger signal 142 as an output to CPU 12 and/or conductors 62. Breakpoint unit 131 provides a signal 135 to breakpoint unit 132, and provides a debug action/trigger signal 141 as an output to CPU 12 and/or conductors 62. Breakpoint unit 132 provides a debug action/trigger signal 140 as an output to CPU 12 and/or conductors 62. Breakpoint unit 133 provides a debug action/trigger signal 143 as an output to CPU 12 and/or conductors 62.

In one embodiment of the present invention, breakpoint units 130, 131, 132, and 133 in FIG. 6 each represent the portion of breakpoint and capture circuitry 40 illustrated in FIG. 5. In alternate embodiments, breakpoint units 130, 131, 132, 133 may not each contain all of the elements illustrated in the portion of breakpoint and capture circuitry 40 shown in FIG. 5. In some embodiments, breakpoint units 130, 131, 132, and 133 are identical; in other embodiments, they may differ from each other. Breakpoint unit 130 outputs a trigger to both breakpoint units 131 and 133. In doing so, the trigger from breakpoint unit 130 is split into two trigger sequences, one for breakpoint unit 131 and the second for breakpoint unit 133. In addition the trigger from breakpoint unit 130 may be split to form a trigger for CPU 12 and/or conductors 62 through debug action/trigger 142. For example, through conductors 62, debug action/trigger 142 can be used to start trace capture in trace history buffer 46. And also through conductors 62, debug action/trigger 140 can be used to halt trace capture in trace history buffer 46. Similarly breakpoint unit 131 can output a trigger to breakpoint unit 132 and/or to debug action/trigger 141. Each of debug action/triggers 140, 141, 142, and 143 can affect CPU 12 (via conductors 52, 54, 56, 58) or any portion of breakpoint and capture circuitry 40.

Figures 7, 8:
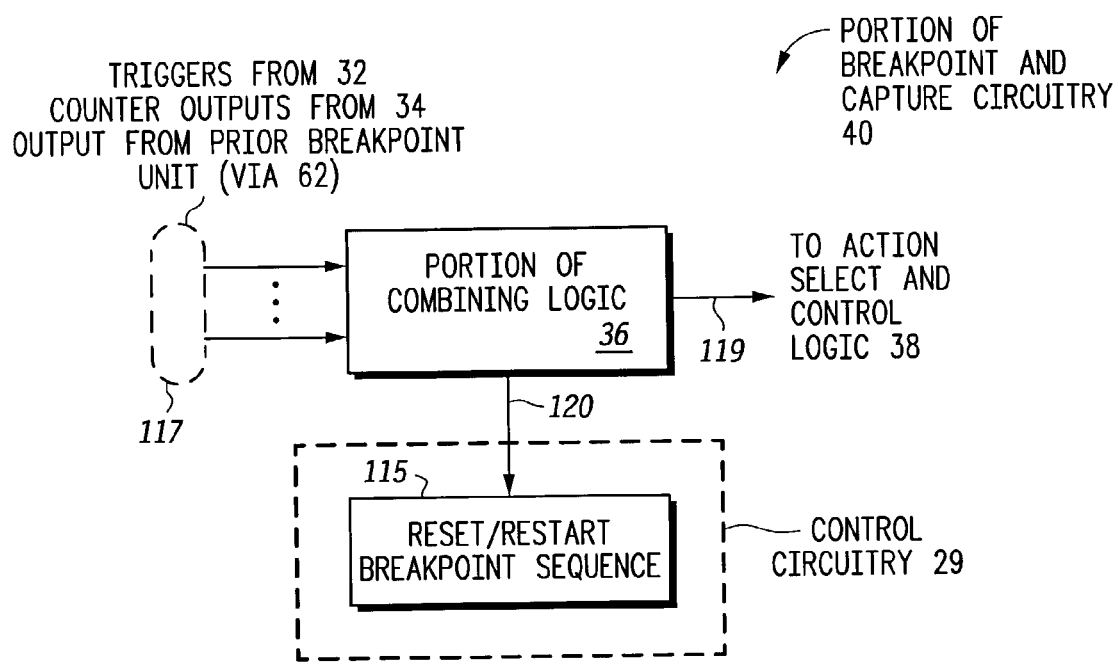
FIG. 7 illustrates, in block diagram form, a portion of breakpoint and capture circuitry 40 of FIG. 2 in accordance with one embodiment of the present invention.
FIG. 8 illustrates, in tabular form, a sample software program under debug which includes CPU instructions of FIG. 3 in accordance with one embodiment of the present invention.

FIG. 7 illustrates a portion of breakpoint and capture circuitry 40 of FIG. 2 in accordance with one embodiment of the present invention. In FIG. 7, trigger signals 117 represent the triggers from trigger circuitry 32, counter triggers from multi-function debug counters 34, intermediate triggers from conductor 62, and/or triggers from other portions of breakpoint and capture circuitry 40. The triggers 117 are combined in a portion of combining logic 36 using control information from registers 30. Combining logic 36 then generates a valid trigger on conductors 119, and this valid trigger is provided to action select and control logic 38 and possibly to other portion of debug circuitry 16 (see FIG. 5). In addition, triggers 117 can also be combined to generate a reset trigger on conductors 120, and this reset trigger can be provided to reset/restart breakpoint sequence circuitry 115 in control circuitry 29 (see FIG. 2). Note that if debug circuitry 16 is programmed by the user for only a single trigger, then the desired trigger from triggers 117 may be passed directly to conductor 119.

If debug circuitry 16 is programmed by the user to form trigger 119 from a combination of triggers from triggers 117, then any of the following combinations can be selected to generate a valid trigger 119 in the illustrated embodiment of the present invention. First, a logical ANDing of a portion of triggers 117 may be selected. Second, a logical ORing of a portion of triggers 117 may be selected. Third, a first trigger from 117 selected by the user arrives, followed afterwards by a second trigger from 117 selected by the user, and then a valid trigger is generated on 119. (Note that for one embodiment of the present invention, trigger 119 is still valid even if the second trigger previously occurred before the first trigger, as long as another occurrence of the second trigger happens after the first trigger). Although the example given is for two triggers, this concept of sequencing the arrival of specific triggers among triggers 117 can be extended beyond two triggers to any desired number of triggers. In addition what is described above as "a trigger", can actually be selected to be a portion of triggers 117 combined in any way.

Fourth, when a first trigger from 117 selected by the user arrives, no valid trigger is generated if the second trigger from 117 selected by the user occurs before the first trigger. If instead the second trigger occurs after the first trigger, then a valid trigger is generated on 119. In one embodiment of the present invention the user can select that if a second trigger comes before the first, instead of no valid trigger being generated, a reset trigger 120 may be generated and may be provided to reset/restart breakpoint sequence 115. This concept can also be extended beyond two triggers to any desired number of triggers, and to any desired combination of triggers. In addition, what is described above as "a trigger" can actually be selected to be a portion of triggers 117 combined in any way.

Fifth, a first trigger from 117 selected by the user must arrive before a second trigger from 117 selected by the user, then a valid trigger may be generated on 119. It is not necessary for the second trigger to arrive for a valid trigger to be generated. In one embodiment of the present invention, it can be selected by the user that if a second trigger comes before the first, instead of no valid trigger being generated, a reset trigger 120 is generated and goes to reset/restart breakpoint sequence 115. This concept can also be extended beyond two triggers to any desired number of triggers, and to any desired combination of triggers. In addition, what is described above as "a trigger" can actually be selected to be a portion of triggers 117 combined in any way.

Sixth, a valid trigger may be generated only when the first trigger formed by the counter expiring arrives before a second trigger from a hardware breakpoint occurs. Another option for this embodiment of the present invention is that a valid trigger is generated only when the first trigger from a hardware breakpoint arrives before a second trigger, formed by the counter expiring, occurs. Reset/restart breakpoint sequence 115 allows for the capability that if a particular trigger sequence in a portion of combining logic 36 is or is not detected correctly (e.g. in a different order then programmed), then the counters can optionally be reset and the original trigger sequence can optionally be reset or restarted. Alternate embodiments of the present invention may use any combination of sequencing or ordering of triggers. The examples described above are just a few possibilities.

FIG. 8 illustrates, in tabular form, a sample software program under debug which includes CPU instructions of FIG. 3 in accordance with one embodiment of the present invention. In the sample program illustrated in FIG. 8, a user's application program for data processing system 10 (see FIG. 1) is being debugged and contains normal instructions executed by CPU 12. Debug port instructions are inserted into the program to assist in understanding the program operation. In this example, a DEBUGCTR ON instruction is inserted and will start a counter in multi-function debug counters 34. A second debug port instruction, DEBUGCTR OFF is also inserted to disable the counter. When the program is executed, the debug counter will first be enabled after the LOAD instruction and will be disabled after the JSR instruction. The counter will represent the time it took to execute instructions between these two points in the program.

In the foregoing specification, the invention has been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A data processing system, comprising:
    a central processing unit coupled to a bus for receiving instructions including a first debug instruction; and
    a debug circuit, comprising:
        registers for being loaded with set-up data, wherein the set-up data comprises breakpoint addresses and counter preload values;

trigger circuitry coupled to the registers and the central processing unit, counter circuitry coupled to the registers and the central processing unit, and combining logic coupled to the registers and to the trigger circuitry;

wherein the counter circuitry is configurable to either count triggers from breakpoint matches or count clock periods;

wherein the central processing unit is characterized as providing a debug communication signal in response to the first debug instruction to at least one of the trigger circuitry, the counter circuitry, and the combining logic; and wherein the combining logic is for using information from the registers to direct the combining of information from the debug communication signal, the trigger circuitry, and the counter circuitry to generate valid triggers.

2. The data processing system of claim 1, further comprising action select and control logic coupled to the combining logic wherein the bus is further characterized as providing a debug halt instruction to the central processing unit and the central processing unit is further characterized as providing a halt signal to the action select and control logic in response to receiving the debug halt instruction.

3. The data processing system of claim 2, wherein the first debug instruction is a debug action select instruction, and the action select and control logic responds to the debug action select instruction by altering an action of the action select and control logic.

4. The data processing system of claim 1, wherein the first debug instruction is a debug event instruction, the debug communication signal is coupled to the combining logic, and the combining logic provides a complex trigger as one of the valid triggers.

5. The data processing system of claim 4, wherein the debug circuit further comprises action select and control logic that provides a first debug action in response to the complex trigger.

6. The data processing system of claim 4, wherein the counter circuitry performs at least one of a start and stop in response to the complex trigger.

7. The data processing system of claim 1, wherein the first debug instruction is a debug event instruction coupled to the counter circuitry, and the counter circuitry performs at least one of a start and stop in response to the debug event instruction.

8. The data processing system of 1, wherein the first debug instruction is a DEBUGCTR ON instruction, the debug communication signal is coupled to the counter circuitry, and the counter circuitry turns on in response to the DEBUGCTR ON instruction.

9. The data processing system of claim 1, wherein the first debug instruction is a DEBUGCTR OFF instruction, the debug communication signal is coupled to the counter circuitry, and the counter circuitry turns off in response to the DEBUGCTR OFF instruction.

10. The data processing system of claim 1, wherein the first debug instruction is a DEBUGCTR HALT instruction, the debug communication signal is coupled to the counter circuitry, and the counter circuitry is prevented from restarting in response to the DEBUGCTR HALT instruction.

11. The data processing system of claim 1, wherein the first debug instruction is a DEBUGCTR RELOAD instruction, the debug communication signal is coupled to the counter circuitry, and the counter circuitry is reloaded in response to the DEBUGCTR RELOAD instruction.

12. The data processing system of claim 1, further comprising a trace history buffer coupled to the counter circuitry, wherein the first debug instruction is a DEBUGCTR TO-TRACE instruction, the debug communication signal is coupled to the counter circuitry, and the trace history buffer is loaded with the contents of the counter circuitry in response to the DEBUGCTR TO-TRACE instruction.

13. The data processing system of claim 1, further comprising transmit and receive circuitry coupled to the counter circuitry, wherein the first debug instruction is a DEBUGCTR TO-TX instruction, the debug communication signal is coupled to the counter circuitry, and the transmit and receive circuitry is loaded with the contents of the counter circuitry in response to the DEBUGCTR TO-TX instruction.

14. A data processing system, comprising:
a central processing unit coupled to a bus for receiving instructions including a first debug instruction; and
a debug circuit, comprising:
registers for being loaded with set-up data, wherein the set-up data comprises breakpoint addresses and counter preload values;
a debug port resource comprising transmit and receive circuitry coupled to the registers and to the central processing unit and a counter coupled to the registers and to the central processing unit, wherein the debug port resource is for using information from the registers to direct the combining of information from the counter and the central processing unit;
wherein the counter is configurable to either count triggers from breakpoint matches or count clock periods; and
wherein the central processing unit is characterized as providing a debug communication signal in response to the first debug instruction for selectively enabling or disabling at least one of the transmit and receive circuitry and the counter.

15. The data processing system of claim 14, wherein the counter is characterized as having contents and wherein the first debug instruction is further characterized as being for routing the contents of the counter to the debug port resource.

16. The data processing system of claim 14, wherein the counter is coupled to the bus and starts counting in response to a first command from the central processing unit and stops counting in response to a second command from the central processing unit.

* * * * *